(12) United States Patent
Otomo et al.

(10) Patent No.: US 9,744,744 B2
(45) Date of Patent: Aug. 29, 2017

(54) PRESS-FORMED ARTICLE AND METHOD FOR MANUFACTURING SAME

(71) Applicant: KABUSHIKI KAISHA KOBE SEIKO SHO (KOBE STEEL, LTD.), Kobe-shi (JP)

(72) Inventors: Ryosuke Otomo, Hyogo (JP); Mamoru Nagao, Hyogo (JP); Mikako Takeda, Hyogo (JP)

(73) Assignee: Kobe Steel, Ltd., Kobe-shi (JP)

( * ) Notice: Subject to any disclaimer, the term of this patent is extended or adjusted under 35 U.S.C. 154(b) by 7 days.

(21) Appl. No.: 14/780,321

(22) PCT Filed: Mar. 17, 2014

(86) PCT No.: PCT/JP2014/057204
§ 371 (c)(1),
(2) Date: Sep. 25, 2015

(87) PCT Pub. No.: WO2014/156790
PCT Pub. Date: Oct. 2, 2014

(65) Prior Publication Data
US 2016/0039180 A1    Feb. 11, 2016

(30) Foreign Application Priority Data
Mar. 26, 2013    (JP) .................. 2013-065233

(51) Int. Cl.
*B21D 22/02*    (2006.01)
*B32B 15/01*    (2006.01)
(Continued)

(52) U.S. Cl.
CPC .......... *B32B 15/013* (2013.01); *B21D 22/208* (2013.01); *B21D 24/04* (2013.01);
(Continued)

(58) Field of Classification Search
CPC .... B21D 22/201; B21D 22/208; B21D 22/22; B21D 22/02; B21D 22/022; C21D 8/0405; C21D 9/48; C21D 1/673; C23C 2/06
See application file for complete search history.

(56) References Cited

U.S. PATENT DOCUMENTS 5,853,903 A * 12/1998 Hosoya .................. C22C 38/12
                                                                148/320
8,741,075 B2 * 6/2014 Imai ........................ C23C 2/26
                                                                148/284
(Continued)

FOREIGN PATENT DOCUMENTS

EP          1 642 991 A1    4/2006
JP          2006-104527 A   4/2006
(Continued)

OTHER PUBLICATIONS

JP 20120076101A, translation, Apr. 19, 2012.*
(Continued)

*Primary Examiner* — Edward Tolan
(74) *Attorney, Agent, or Firm* — Oblon, McClelland, Maier & Neustadt, L.L.P.

(57) ABSTRACT

A method for manufacturing a press-formed article, said method comprising forming a galvanized steel sheet or an alloyed hot-dip galvanized steel sheet by hot press forming, wherein, after heating the steel sheet and holding the same, the forming is started at a temperature of 680-750° C. inclusive, while allowing liquid zinc to remain on the surface of the steel sheet, and the forming is performed while regulating the strain rate in a plastic deformation part of the steel sheet to 0.5 sec$^{-1}$ or lower.

13 Claims, 2 Drawing Sheets

(51) Int. Cl.
| | |
|---|---|
| C23C 2/06 | (2006.01) |
| C23C 2/28 | (2006.01) |
| C23C 2/40 | (2006.01) |
| C21D 1/18 | (2006.01) |
| C22C 18/04 | (2006.01) |
| B21D 22/20 | (2006.01) |
| B21D 24/04 | (2006.01) |
| C23C 2/26 | (2006.01) |
| C21D 1/673 | (2006.01) |
| C21D 9/00 | (2006.01) |
| C21D 9/46 | (2006.01) |
| C22C 38/02 | (2006.01) |
| C22C 38/04 | (2006.01) |
| C22C 38/06 | (2006.01) |
| C22C 38/08 | (2006.01) |
| C22C 38/14 | (2006.01) |
| C22C 38/16 | (2006.01) |
| C22C 38/28 | (2006.01) |
| C22C 38/32 | (2006.01) |
| C22C 38/00 | (2006.01) |
| C22C 38/58 | (2006.01) |

(52) U.S. Cl.
CPC ............... *C21D 1/18* (2013.01); *C21D 1/673* (2013.01); *C21D 9/0068* (2013.01); *C21D 9/46* (2013.01); *C22C 18/04* (2013.01); *C22C 38/02* (2013.01); *C22C 38/04* (2013.01); *C22C 38/06* (2013.01); *C22C 38/08* (2013.01); *C22C 38/14* (2013.01); *C22C 38/16* (2013.01); *C22C 38/28* (2013.01); *C22C 38/32* (2013.01); *C23C 2/06* (2013.01); *C23C 2/26* (2013.01); *C23C 2/28* (2013.01); *C23C 2/40* (2013.01); *B32B 2605/08* (2013.01); *C22C 38/00* (2013.01); *C22C 38/58* (2013.01)

(56) References Cited

U.S. PATENT DOCUMENTS

2001/0042393 A1* 11/2001 Kefferstein ............ B21D 22/20
72/47
2011/0236719 A1 9/2011 Hensen et al.

FOREIGN PATENT DOCUMENTS

| | | |
|---|---|---|
| JP | 2006-152361 A | 6/2006 |
| JP | 2008-284610 A | 11/2008 |
| JP | 2011-117086 A | 6/2011 |
| JP | 2012-076101 A | 4/2012 |
| JP | 2012-91229 A | 5/2012 |
| JP | 2012-512747 A | 6/2012 |
| WO | WO 2012/043833 A1 | 4/2012 |

OTHER PUBLICATIONS

Extended European Search Report issued on Oct. 5, 2016 Application No. 14775588.8.
International Search Report and Written Opinion issued Jun. 17, 2014 in PCT Application No. PCT/JP2014/057204 (with English Translation).

* cited by examiner

PRESS-FORMED ARTICLE AND METHOD FOR MANUFACTURING SAME

TECHNICAL FIELD

The present invention relates to a press-formed article that is required to have such a strength and corrosion resistance so as to be employed in a structural member of an automobile component and to a manufacturing method thereof, and particularly relates to a press-formed article with a predetermined strength obtained by quenching a galvanized steel sheet or a hot-dip galvannealed steel sheet while providing a shape thereto when the steel sheet is press-formed into a predetermined shape after heated and to a manufacturing method of such a press-formed article.

BACKGROUND ART

In recent years, in order to realize a light-weight automobile, an application of high-strength steel to a body has advanced, and application of a steel sheet with a tensile strength of over 980 MPa has expanded. In contrast, problems such as a decrease in life duration of a mold used when the component is processed and a greater variation in shapes due to springback occur as the strength increases. Thus, a method has been developed in which deformation resistance is reduced while springback is reduced by heating a low-strength steel sheet at a temperature (approximately 900° C. or more) that is equal to or greater than a transformation point Ac1 before press-forming to austenitize the steel sheet and then forming it in a high-temperature range, while the strength of a formed article is secured by performing quenching while forming, a so-called hot press-forming method (hereinafter, also referred to as a "hot stamp"). Such a hot stamp has been distributed as a method of manufacturing a component (press-formed article) required to have a high strength in a class of 1470 MPa or greater in terms of a tensile strength, in particular.

In contrast, it is essential to provide a sacrificial protection effect to components that are applied to a side member, a side sill, a cross member, a pillar lower part, and the like, which are required to have high corrosion resistance, in the automobile structural members, and cold formed components of galvanized steel sheets or hot-dip galvannealed steel sheet has been applied heretofore. Currently, there is a requirement of a press-formed article with a high strength and high corrosion resistance which can be applied to a side member, a side sill, a cross member, a pillar lower part, or the like and is obtained by forming a galvanized steel sheet or a hot-dip galvannealed steel sheet into a component in a hot stamp process.

FIG. 1 is an explanatory outline diagram illustrating a mold configuration for performing the hot stamp as described above, and in the diagram, 1 represents a punch, 2 represents a die, 3 represents a blank holder, 4 represents a steel sheet (blank), BHF represents blank holding force, rp represents a radius of a punch shoulder, rd represents a radius of a die shoulder, and CL represents a clearance between the punch and the die, respectively. Among these components, paths 1a and 2a through which a cooling medium (such as water) can be made to flow are formed inside the punch 1 and the die 2, respectively, and these members are configured to be cooled by making the cooling medium to flow through the paths.

When the hot stamp (such as hot deep drawing processing) is performed by using such a mold, the forming is started in a state in which the steel sheet (blank) 4 is heated at a two-phase range temperature (from a transformation point Ac1 to a transformation point Ac3) or at a single-phase range temperature of equal to or greater than a transformation point Ac3 and is softened. That is, the steel sheet 4 is press-fitted into a hole (between 2 and 2 in FIG. 1) of the die 2 by the punch 1 in a state in which the steel sheet 4 in the high-temperature state is pinched between the die 2 and the blank holder 3 and is formed into a shape corresponding to an outer shape of the punch 1 while reducing an outer diameter of the steel sheet 4. In addition, heat release from the steel plate 4 to the mold (the punch 1 and the die 2) is performed by cooling the punch 1 and the die 2 in parallel with the forming, and the material is quenched by further cooling and keeping it at a bottom dead center of the forming (a timing at which a tip end of the punch is located at the deepest position: the state illustrated in FIG. 1). By performing such a press-forming method, it is possible to obtain a formed article in a class of 1470 MPa or greater with high dimensional precision. It is also possible to reduce a forming load as compared with a case of cold-forming a component in the same strength class, and therefore, only a pressing machine with a small volume is required.

However, if a galvanized steel sheet or a hot-dip galvannealed steel sheet is subjected to the hot stamp, cracking occurs during press-forming due to liquid metal embrittlement (hereinafter, also referred to as "LME") in which zinc liquefied (melted) at a high temperature enters a grain boundary of the steel sheet and the steel sheet embrittles, and problems such as a decrease in an impact resistant property and a fatigue strength of the component (press-formed article) occur.

In order to suppress cracking (hereinafter, also referred to as "LME cracking") due to such LME, PTL 1, for example, proposes a method of suppressing the occurrence of cracking during press-forming processing by setting a high-temperature holding time before the press-forming to be relatively long (300 seconds or longer, for example) to accelerate alloying of a plated layer and to increase Fe concentration in the plated layer. However, according to this method, it is necessary to perform heating and holding for a long period of time in the hot stamp process, and there is a disadvantage that productivity is degraded.

CITATION LIST

Patent Literature

PTL 1: JP-T-2012-512747

SUMMARY OF INVENTION

Technical Problem

The present invention was made in view of the aforementioned circumstances, and an object thereof is to provide an effective method of manufacturing a press-formed article that exhibits a high strength while avoiding the occurrence of LME cracking even if the heating and holding time before the forming is shortened when hot press-forming using a galvanized steel sheet or a hot-dip galvannealed steel sheet is performed, and to provide a press-formed article that is obtained by such a method.

Solution to Problem

A method of the present invention that can achieve the aforementioned object is a method of manufacturing a press-formed article by forming a galvanized steel sheet or a hot-dip galvannealed steel sheet by a hot press-forming method including after heating and holding the steel sheet, starting the forming at a temperature that is 680° C. or more and 750° C. or less in a state in which liquid zinc is present on a surface of the steel sheet, and performing the forming while setting a strain rate at a plastic deformation portion of the steel sheet to be 0.5 seconds$^{-1}$ or less.

In the method according to the present invention, it is preferable that the heating and holding of the steel sheet is performed at a temperature that is 880° C. or more and 920° C. or less for 10 seconds to 4 minutes.

As a specific reference to perform the forming while setting the strain rate at the plastic deformation portion of the steel sheet to be 0.5 seconds$^{-1}$ or less, a configuration is exemplified in which forming of the plastic deformation portion is performed for [t/(R+t/2)] seconds or more where t (mm) represents a thickness of the steel sheet and R (mm) represents a curvature radius (inner diameter) of the plastic deformation portion. By employing the configuration, it is possible to perform the press forming while avoiding the occurrence of LME cracking even if a small amount of liquid zinc is present on the surface of the steel sheet when the forming is started.

The present invention includes a press-formed article that is manufactured by the method as described above.

Advantageous Effects of Invention

According to the present invention, it was possible to manufacture, with high productivity, a press-formed article that exhibits a satisfactory property while avoiding the occurrence of LME cracking even if a heating time before the forming is shortened, by appropriately controlling a heating condition before the forming and the strain rate at the plastic deformation portion of the steel sheet during the forming when the hot press-forming using the galvanized steel sheet or the hot-dip galvannealed steel sheet is performed.

DESCRIPTION OF EMBODIMENTS

Figure 1:
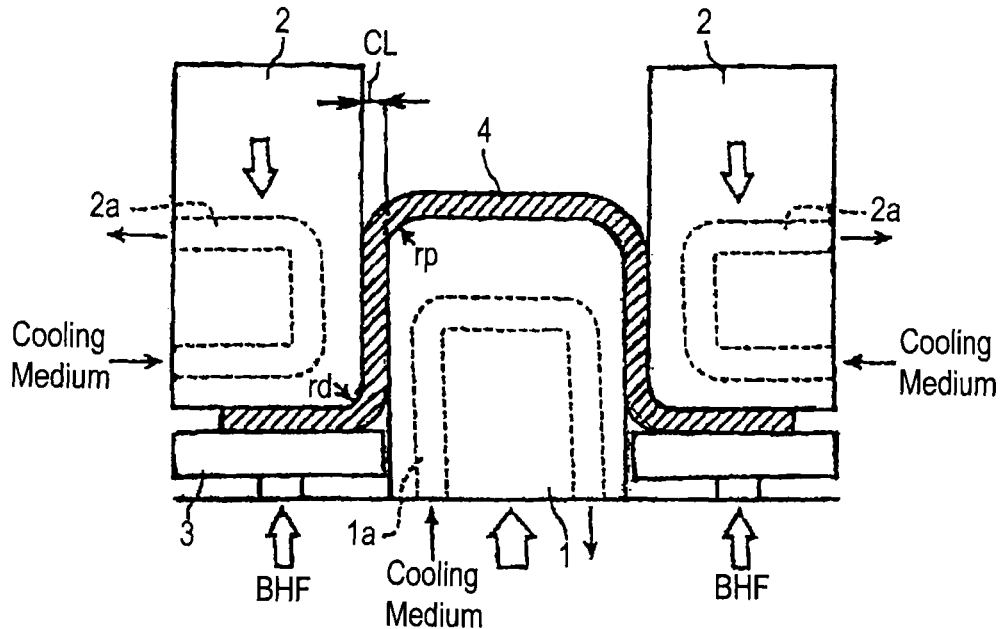
FIG. 1 is an explanatory outline diagram illustrating a mold configuration for performing hot press-forming.

The inventors conducted review from various angles in order to manufacture, with high productivity, a press-formed article that exhibits a satisfactory property while avoiding the occurrence of LME cracking during the press-forming even if a heating and holding time is shortened when the press-formed article is manufactured by performing hot press-forming after heating a galvanized steel sheet or a hot-dip galvannealed steel sheet at a predetermined temperature.

As a result, the inventors discovered that the occurrence of LME cracking could be suppressed by lowering a deformation rate (strain rate) during hot stamp forming. As a result of further review, the present inventors discovered that the aforementioned object could be satisfactorily achieved by starting the press-forming from a predetermined temperature range after heating the steel sheet at a predetermined temperature for a predetermined time period and performing press-forming while setting a strain rate at a plastic deformation portion of the steel sheet during the forming to be 0.5 seconds$^{-1}$ or less, and completed the present invention.

The LME cracking occurs when the press forming is performed in a state in which the base steel sheet has embrittled due to melted liquid zinc. It is considered that cracking occurs where the steel sheet with the liquid zinc adhering thereto is press-formed since the liquid zinc infiltrates into the grain boundary and bearing force of the grain boundary is lost. A zinc-plated layer is liquefied during the heating before the press-forming, a reaction of generating a solid alloy phase of Fe/Zn at an interface with the steel sheet advances, and Fe concentration in the plated layer increases. It is known that when a predetermined period of time or more has passed since the heating, LME cracking does not occur even if press-forming is performed thereafter since the liquid zinc in the plated layer substantially disappears (PTL 1). However, since it is necessary to hold the steel sheet for a long period of time before the press-forming after the heating, productivity is degraded.

As a result of reviewing influences of various process conditions by the present inventors under such circumstances, they discovered that it is possible to suppress cracking due to LME even if the time, during which the steel sheet is held (holding time) in the heating process before the press-forming, is set to be as relatively short as 4 minutes or less, by performing the forming such that the strain rate at the plastic deformation portion of the steel sheet during the forming is 0.5 seconds$^{-1}$ or less. The strain rate here is preferably 0.4 seconds$^{-1}$ or less (more preferably 0.3 seconds$^{-1}$ or less). However, since an excessive decrease in the strain rate brings about degradation in productivity, it is preferably set to be 0.1 seconds$^{-1}$ or more. Although the holding time may be 4 minutes or less (preferably 3 minutes or less) as described above, it is preferably 10 seconds or more (preferably 30 seconds or more, and more preferably 1 minute or more) from a viewpoint of austenitizing the entire microstructure of the steel.

As a specific reference to perform the forming while setting the strain rate at the plastic deformation portion of the steel sheet (a galvanized steel sheet or a hot-dip galvannealed steel sheet) to be 0.5 seconds$^{-1}$ or less, a configuration is exemplified in which formation of the plastic deformation portion is performed for t/(R+t/2) seconds or more where t (mm) represents a thickness of the steel sheet and R (mm) represents a curvature radius (inner diameter) of the plastic deformation portion. Such a circumstance will be described with reference to drawings.

Figure 2:
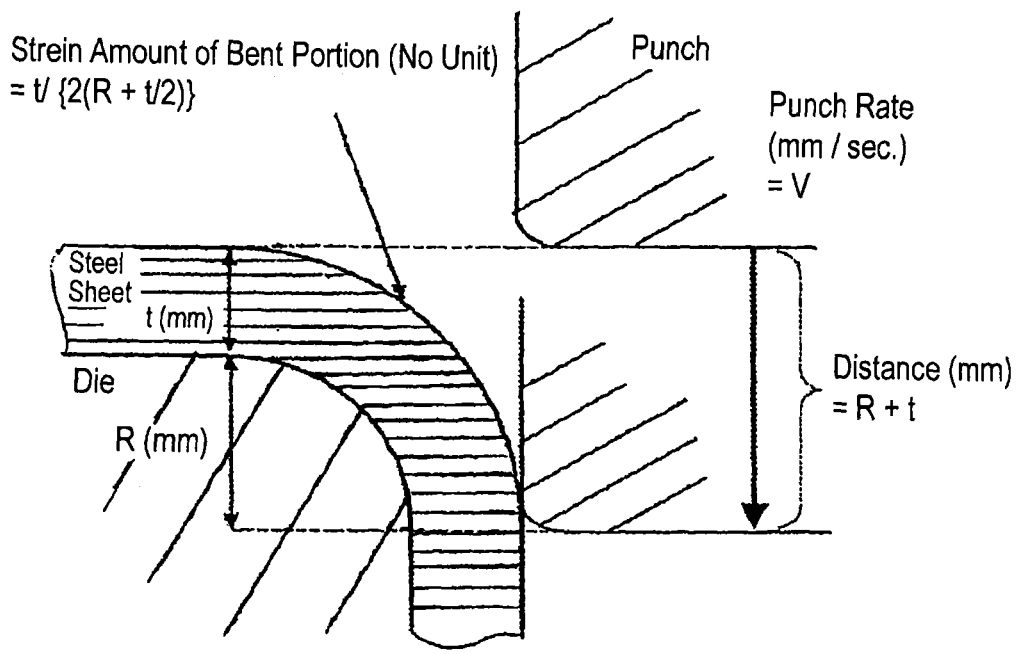
FIG. 2 is an explanatory outline diagram illustrating a mechanism in the mold when the present invention is performed.

FIG. 2 is an explanatory outline diagram illustrating a mechanism in a mold when the present invention is performed. The mold configuration illustrated in FIG. 2 is in an upside-down state with respect to the mold configuration illustrated in FIG. 1 for the convenience of explanation. In addition, the curvature radius (inner diameter) R (mm) of the plastic deformation portion (denoted as a "bent portion" in FIG. 2) corresponds to the radius rd of the die shoulder illustrated in FIG. 1.

Since a time required for processing is represented as $\Delta t = (R+t)/V$ (see FIG. 2) where W (seconds$^{-1}$) represents a strain rate, $\Delta t$ (seconds) represents the time required for the processing, t (mm) represents a thickness of the steel sheet, V (mm/second) represents a punch rate, and R (mm) represents the curvature radius (inner diameter) of the plastic deformation portion, the strain rate W (seconds$^{-1}$) is represented as the following formula (1).

$$W=t/\{2(R+t/2)\}/\Delta t=V\times t/\{2(R+t)\times(R+t/2)\} \quad (1)$$

Satisfying W≤0.5 means that the forming is performed such that the punch rate V (mm/second) satisfies the relationship of the following formula (2). It can be found from these relationships that the forming of the plastic deformation portion may be performed for [t/(R+t/2)] seconds or more. In a case in which the thickness is 1.4 mm and the curvature radius (inner diameter) is 5 mm or 10 mm, for example, a forming rate corresponds to 0.25 seconds or more or 0.13 seconds or more, respectively. Alternatively, in a case in which the thickness is 0.8 mm and the curvature radius (inner diameter) is 5 mm or 10 mm, a forming rate corresponds to 0.15 seconds or more or 0.08 seconds or more, respectively.

$$V \leq \{(R+t)\times(R+t/2)\}/t \quad (2)$$

Although a region in which the press forming is performed at the strain rate as described above may be at least the plastic deformation portion (the region illustrated in FIG. 2), the forming of the other steel sheet region may also be performed at the similar strain rate. However, since LME cracking does not frequently occur in the region other than the plastic deformation portion, the press-forming may be performed while setting the strain rate to be greater than 0.5 seconds$^{-1}$.

Although details of the mechanism of achieving the aforementioned advantage by the present invention are not obvious, it is presumed to be due to a balance between an alloying reaction rate of the liquid zinc that is about to infiltrate and the base steel sheet and a deformation rate of the base steel sheet. A solid alloy layer portion in the plated layer after the press-forming cannot follow deformation of the base steel sheet during the press-forming, fractures are generated at some locations, and thus gaps are formed. It is considered that where the liquid zinc remains in the plated layer, the liquid zinc enters the gaps and is brought into contact with a surface on which the base steel newly appears and a new alloying reaction advances. It is considered that where the press-forming is performed at a higher strain rate as compared with the advance of the alloying reaction that occurs then, the liquid zinc infiltrates into the grain boundary and LME cracking occurs. It is considered that embrittlement of the base steel sheet does not occur where the strain rate is lowered in contrast since processing deformation advances while the liquid zinc is blocked by a new alloying reaction.

In the method according to the present invention, when a press-formed article is manufactured by press-forming a galvanized steel sheet or a hot-dip galvannealed steel sheet after plating processing is performed on the surface of the base steel sheet (which will be collectively referred to as "surface-treated steel sheet" in some cases) by using a mold, the surface-treated steel sheet is heated and held first. The heating here is preferably performed at a temperature that is 880° C. or more and 920° C. or less. In order to exhibit an effect obtained by the hot press method, it is preferable that the heating temperature is at least 880° C. or more. If the heating temperature is less than 880° C., it is not possible to obtain an appropriate amount of austenite during the heating and to secure a satisfactory forming property. If the heating temperature exceeds 920° C., zinc in the plated layer of the surface-treated steel sheet boils and evaporates, and corrosion resistance is degraded, which is unfavorable. In addition, a more preferable lower limit of the heating temperature is 900° C. or more (a temperature at which austenitizing fully proceeds), and a more preferable upper limit is 910° C. or less. The heating temperature in the present invention is a value that is obtained by measuring a surface temperature of the steel sheet (the same is true for temperatures described below).

The holding time in the aforementioned temperature range (a time during which the steel sheet is held in the heating process before the press-forming) may be 4 minutes or less (preferably 3 minutes or less) as described above. That is, it is possible to suppress cracking due to LME in the following press-forming even if the holding time is 4 minutes or less. However, if the holding time is excessively short, it is not possible to obtain an appropriate amount of austenite during the heating and to secure satisfactory forming property. Therefore, it is preferable that the holding time is at least 10 seconds or more (preferably 30 seconds or more, and more preferably 1 minute or more).

In relation to ordinary hot press-forming, it has been considered from a viewpoint of enhancing productivity and reducing press reaction force that starting the forming at a temperature that is as high as possible when the press-forming is performed after the steel sheet is heated up to a predetermined temperature and is then ejected from a heating furnace is a necessary requirement in the forming in order to secure a satisfactory forming property. In such a circumstance, it has also been considered to be necessary to start the forming at a temperature that is as high as possible immediately after the steel sheet is ejected from the heating furnace when a hot press-formed article is manufactured by press-forming a surface-treated steel sheet with a zinc-based plated layer formed thereon. However, where the hot press-forming is performed based on such an idea, peeling-off of the plated layer and cracking at grain boundaries frequently occurred during the press forming, and it has not been possible to realize a hot press-formed article with a satisfactory surface condition.

It is preferable to cool the surface-treated steel sheet up to a predetermined temperature after heating and holding it and to be formed in a state in which liquid zinc in the plated layer is reduced as much as possible. From such a viewpoint, it is necessary to set the press-forming start temperature to be 750° C. or less. However, when it takes too much time on cooling a large-scaled actual component, productivity in the press production process is degraded. Therefore, and in order to avoid variations in material properties after the pressing due to non-uniform cooling, it is necessary to set the lower limit to be 680° C. or more. Thereby, peeling-off of the plated layer during the forming is prevented. In addition, it is possible to eliminate peeling-off of the plated layer and cracking at grain boundaries that conventionally occur because the plated layer in the molten state is press-formed. However, in a case of performing the press-forming at the aforementioned strain rate, it is possible to secure a satisfactory press-forming property even if a small amount of liquid zinc is present on the surface of the steel sheet.

In addition, it is effective to heat the surface-treated steel sheet, cool it once, and then start the press-forming in terms of further enhancement in the forming property. This is because an n value (processing hardening modulus) of supercooled austenite increases due to the cooling up to the predetermined temperature after the heating. Since an increase in the n value contributes to uniform deformation in general, it is possible to enhance a forming property in all forming modes including shrink flanging, stretch flanging, stretch forming, and bent forming.

In relation to an average cooling rate during the cooling, it is preferable to secure an average cooling rate of 20° C./second or more in order to facilitate coagulation of the plated layer as much as possible. It is more preferably 30° C./second or more. However, since it is not possible to secure a satisfactory forming property if a cooling stop temperature in the cooling (that is, the press-forming start temperature) is excessively low, it is necessary to set the cooling stop temperature to be 680° C. or more. It is preferably 700° C. or more.

The surface-treated steel sheet used in the present invention is a galvanized steel sheet or a hot-dip galvannealed steel sheet. In relation to the steel type of the steel sheet (base steel sheet) as a base material of these surface-treated steel sheets, one which has an ordinary chemical composition as a high-strength steel sheet may be used (see Table 1 in Example which will be described later). A main object of forming a component in the hot press-forming is to increase strength, and the strength is secured by performing quenching in a process of cooling in the mold. Therefore, a steel sheet to which an element for enhancing a quenching property, such as B or Mn in addition to C is added is generally used. It is possible to use a hot-rolled steel sheet or a cold-rolled steel sheet that is obtained by cold-rolling a hot-rolled steel sheet.

The galvanized steel sheet used in the present invention can be obtained by galvanizing a hot-rolled steel sheet or a cold-rolled steel sheet. A preferable plating adhesion amount in the zinc-plated layer ranges from about 30 to about 200 g/m² for each surface, and thus it is possible to obtain sufficient corrosion resistance. As methods of plating processing, hot-dip plating and electroplating are exemplified. It is possible to prepare and use a galvannealed steel sheet (generally, a hot-dip galvannealed steel sheet), which is obtained by holding the steel sheet at a predetermined temperature (from 470° C. to 580° C.) for 1 minute to 10 minutes after the plating processing, in which the plated layer and iron in the base steel sheet are alloyed.

Although a further specific description will be given below of the advantage of the present invention with reference to examples, the examples are not intended to limit the present invention, and changes in design within the gist described above and below are also included in the technical scope of the present invention.

EXAMPLES

Steel materials with the chemical compositions (steel types A to F) described in the following Table 1 were slab-melted and then subjected to hot-rolling to obtain hot-rolled steel sheets with a thickness of 3.2 mm. By cold-rolling them, cold-rolled steel sheets with a thickness of 0.8 mm or 1.4 mm were obtained. The steel sheets were subjected to galvanizing processing, and galvanized steel sheets were obtained. Here, the galvanizing processing was performed by using a batch-type atmosphere control annealing and plating processing apparatus. In addition, some of the steel sheets were subjected to alloying processing to obtain galvannealed steel sheets. The galvanizing processing and the alloying processing were performed by using an experimental furnace that was able to control atmosphere, was provided with heating and cooling mechanisms and a crucible as a galvanizing bath, and was able to perform the plating processing and the alloying processing in a consecutive process.

As conditions of the plating processing, the steel sheets were dipped into a Zn bath (containing 0.13% of Al) at 460° C. for 3 seconds. The alloying processing was performed by holding the steel sheets in an atmosphere of 5% $H_2$—$N_2$ (a dew point: −45° C.) at 550° C. for twenty seconds, and they were then cooled by blowing Ar gas. An average cooling rate here is 15° C./second.

The plating adhesion amount in the galvanized steel sheets and the galvannealed steel sheets were evaluated based on sectional SEM (scanning electron microscopy) observation and measurement of Fe concentration in the plating.

TABLE 1

| Steel Type | Chemical composition * (% by mass) | | | | | | | | | | |
| --- | --- | --- | --- | --- | --- | --- | --- | --- | --- | --- | --- |
| | C | Si | Mn | B | Ti | Cr | Ni | Cu | Al | S | P |
| A | 0.22 | 0.2 | 1.2 | 0.0030 | — | — | — | — | 0.03 | 0.002 | 0.007 |
| B | 0.21 | 0.6 | 1.2 | 0.0030 | 0.050 | — | — | 0.02 | 0.04 | 0.004 | 0.009 |
| C | 0.21 | 0.6 | 1.2 | 0.0030 | 0.075 | — | 0.01 | 0.02 | 0.03 | 0.005 | 0.008 |
| D | 0.21 | 1.2 | 1.2 | 0.0025 | 0.051 | 0.02 | — | — | 0.03 | 0.003 | 0.009 |
| E | 0.22 | 1.2 | 2.1 | 0.0015 | 0.051 | — | — | — | 0.04 | 0.003 | 0.006 |
| F | 0.22 | 1.4 | 1.2 | 0.0025 | — | — | — | — | 0.03 | 0.005 | 0.009 |

* Remainder: iron and inevitable impurities other than P and S

Tensile test pieces were cut from the thus obtained galvanized steel sheets or the hot-dip galvannealed steel sheets and were then processed by using a uniaxial tensile-type processing formaster apparatus after simulating temperature histories in the hot stamp process, and a test for evaluating depths of LME cracking at plastic deformation portions (bent portions) was conducted.

Zinc plating on one side of each test piece was polished and removed, and temperature control was performed by a thermoelectric couple installed on the surface from which the plating was removed. Although induction heating, electric heating and the like can be considered as a heating scheme, parallel parts of the test pieces were electrically heated while being subjected to induction heating in vicinities of pinching portions of the test pieces in this test.

For the temperature histories, the test pieces were heated from a room temperature to a temperature T1 (about 900° C.), were held for a predetermined period of time t1, were then cooled up to a processing temperature T2, and were processed at a constant strain rate (seconds$^{-1}$) up to a predetermined intended strain amount in a state in which the liquid zinc remained on the surfaces of the test pieces. The heating and the processing were performed in the atmosphere. In only a cooling process, the cooling was performed by the blowing of Ar gas. It was confirmed that the liquid zinc remained on the surfaces of the test pieces during the test by observing zinc layers with white appearances remaining on parts of the plated layers in the sectional SEM (scanning electron microscopy) observation for "measurement of the maximum cracking depths" that was conducted after the test.

As actual values of the strain amounts, reference lines were marked in advance at a reference point interval of 20 mm on the rear surface (on the side from which the plating was removed) of the test piece, and stretch rates (%) of the reference point interval was measured as amounts of logarithmic strain.

[Measurement of Maximum Cracking Depths]

Figure 3:
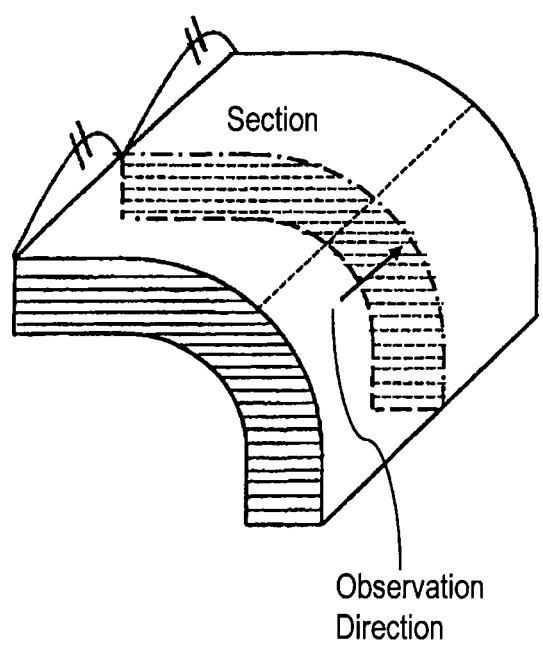
FIG. 3 is a diagram related to an R part of a steel sheet, which illustrates a section that perpendicularly bisects a ridge line of the R part.

R parts of the steel sheets, which were formed to have hat shapes on the rear surfaces of the test pieces, were cut along sections (see FIG. 3) that perpendicularly bisected ridge lines of R to produce resin-filled polished samples. The sections were observed by the SEM. Cracking depths of cracking with maximum extension depths at the R parts below the plated layers (at locations where cracking extended to the base steel sheets) were measured. Under the respective test conditions, correspondence between the strain rates W and the maximum cracking depths after the start of the processing was checked.

Since impact resistant property of the components is not affected where the cracking depth that extended to the surface of the base steel sheet is less than 10 μm, the test pieces with the cracking depths of 10 μm or more were determined to have unfavorable LME cracking resistant properties (LME cracking resistance).

These results will be shown in the following Tables 2 to 4 along with the thicknesses, plating adhesion amounts, whether the alloying processing was performed, press-forming conditions [heating temperatures, heating and holding times, average cooling rates before the forming, forming start temperatures, strain amounts (intended and actual), strain rates (intended and actual), and forming times], and the like.

TABLE 2

| Test No. | Steel type | Thickness t(mm) | Plating adhesion amount (g/m²) | Alloying processing | Heating temperature T1(° C.) | Heating and holding time t1 (min.) | Average cooling rate before forming (° C./sec.) |
|---|---|---|---|---|---|---|---|
| 1 | A | 1.4 | 109 | Done | 900 | 1 | 30 |
| 2 | A | 1.4 | 96 | Done | 900 | 1 | 30 |
| 3 | A | 1.4 | 97 | Done | 900 | 1 | 30 |
| 4 | A | 1.4 | 130 | Done | 900 | 1 | 30 |
| 5 | A | 1.4 | 125 | Done | 900 | 1 | 30 |
| 6 | A | 1.4 | 111 | Done | 900 | 1 | 30 |
| 7 | A | 1.4 | 124 | Done | 900 | 1 | 30 |
| 8 | A | 1.4 | 125 | Done | 900 | 1 | 30 |
| 9 | A | 1.4 | 105 | Done | 900 | 1 | 30 |
| 10 | A | 1.4 | 117 | Not done | 900 | 1 | 30 |
| 11 | A | 1.4 | 99 | Not done | 900 | 1 | 30 |
| 12 | A | 1.4 | 112 | Not done | 900 | 1 | 30 |
| 13 | A | 1.4 | 117 | Not done | 900 | 1 | 30 |
| 14 | A | 1.4 | 113 | Not done | 900 | 1 | 30 |
| 15 | A | 1.4 | 108 | Not done | 900 | 1 | 30 |
| 16 | A | 1.4 | 97 | Not done | 900 | 1 | 30 |
| 17 | A | 1.4 | 112 | Not done | 900 | 1 | 30 |

| Test No. | Forming start temperature T2 (° C.) | Intended strain amount (%) | Intended strain rate (sec.$^{-1}$) | Forming time (sec.) | Actual strain amount (%) | Actual strain rate (sec.$^{-1}$) | Maximum cracking depth (μm) |
|---|---|---|---|---|---|---|---|
| 1 | 750 | 6.5 | 0.10 | 0.65 | 6.7 | 0.10 | 0 |
| 2 | 750 | 6.5 | 0.20 | 0.33 | 6.6 | 0.20 | 0 |
| 3 | 750 | 6.5 | 0.33 | 0.20 | 6.7 | 0.34 | 2 |
| 4 | 750 | 6.5 | <u>0.59</u> | 0.11 | 6.7 | <u>0.61</u> | <u>16</u> |
| 5 | 750 | 12.0 | 0.18 | 0.67 | 12.3 | 0.18 | 0 |
| 6 | 750 | 12.0 | 0.36 | 0.33 | 12.2 | 0.37 | 3 |
| 7 | 750 | 12.0 | 0.46 | 0.26 | 12.2 | 0.47 | 5 |
| 8 | 750 | 12.0 | <u>0.60</u> | 0.20 | 12.3 | <u>0.62</u> | <u>18</u> |
| 9 | 750 | 12.0 | <u>0.80</u> | 0.15 | 12.2 | <u>0.81</u> | <u>75</u> |
| 10 | 750 | 6.5 | 0.10 | 0.65 | 6.7 | 0.10 | 0 |
| 11 | 750 | 6.5 | 0.20 | 0.33 | 6.8 | 0.21 | 0 |
| 12 | 750 | 6.5 | 0.33 | 0.20 | 6.6 | 0.34 | 4 |
| 13 | 750 | 6.5 | <u>0.59</u> | 0.11 | 6.6 | <u>0.60</u> | <u>18</u> |
| 14 | 750 | 12.0 | 0.18 | 0.67 | 12.2 | 0.18 | 0 |
| 15 | 750 | 12.0 | 0.36 | 0.33 | 12.1 | 0.36 | 3 |
| 16 | 750 | 12.0 | 0.46 | 0.26 | 12.2 | 0.47 | 6 |
| 17 | 750 | 12.0 | <u>0.60</u> | 0.20 | 12.2 | <u>0.61</u> | <u>20</u> |

TABLE 3

| Test No. | Steel type | Thickness t(mm) | Plating adhesion amount (g/m²) | Alloying Processing | Heating condition Heating temperature T1(° C.) | Heating and holding time t1 (min.) | Average cooling rate before forming (° C./sec.) |
|---|---|---|---|---|---|---|---|
| 18 | A | 1.4 | 119 | Not done | 900 | 1 | 30 |
| 19 | A | 1.4 | 129 | Not done | 900 | 1 | 30 |
| 20 | A | 1.4 | 110 | Not done | 900 | 1 | 30 |
| 21 | A | 1.4 | 111 | Not done | 900 | 1 | 30 |
| 22 | A | 1.4 | 102 | Not done | 900 | 1 | 30 |
| 23 | A | 1.4 | 113 | Not done | 900 | 1 | 30 |
| 24 | A | 1.4 | 104 | Not done | 900 | 2 | 30 |
| 25 | A | 1.4 | 106 | Not done | 900 | 2 | 30 |
| 26 | A | 1.4 | 102 | Not done | 900 | 4 | 30 |
| 27 | A | 1.4 | 115 | Not done | 900 | 4 | 30 |
| 28 | A | 1.4 | 100 | Not done | 910 | 1 | 30 |
| 29 | A | 1.4 | 100 | Not done | 910 | 1 | 30 |
| 30 | A | 1.4 | 128 | Not done | 880 | 1 | 30 |
| 31 | A | 1.4 | 108 | Not done | 880 | 1 | 30 |
| 32 | B | 1.4 | 127 | Not done | 900 | 1 | 30 |
| 33 | B | 1.4 | 95 | Not done | 900 | 1 | 30 |

| Test No. | Forming start temperature T2 (° C.) | Intended strain amount (%) | Intended strain rate (sec.⁻¹) | Forming time (sec.) | Actual strain amount (%) | Actual strain rate (sec.⁻¹) | Maximum cracking depth (μm) |
|---|---|---|---|---|---|---|---|
| 18 | 750 | 12.0 | 0.80 | 0.15 | 12.1 | 0.81 | 85 |
| 19 | 720 | 12.0 | 0.36 | 0.33 | 12.2 | 0.37 | 3 |
| 20 | 720 | 12.0 | 0.60 | 0.20 | 12.2 | 0.61 | 24 |
| 21 | 720 | 12.0 | 0.80 | 0.15 | 12.3 | 0.82 | 87 |
| 22 | 680 | 12.0 | 0.36 | 0.33 | 12.3 | 0.37 | 2 |
| 23 | 680 | 12.0 | 0.60 | 0.20 | 12.1 | 0.61 | 15 |
| 24 | 750 | 12.0 | 0.36 | 0.33 | 12.2 | 0.37 | 2 |
| 25 | 750 | 12.0 | 0.60 | 0.20 | 12.1 | 0.61 | 19 |
| 26 | 750 | 12.0 | 0.36 | 0.33 | 12.1 | 0.36 | 3 |
| 27 | 750 | 12.0 | 0.60 | 0.20 | 12.2 | 0.61 | 17 |
| 28 | 750 | 12.0 | 0.36 | 0.33 | 12.1 | 0.36 | 3 |
| 29 | 750 | 12.0 | 0.60 | 0.20 | 12.3 | 0.62 | 18 |
| 30 | 750 | 12.0 | 0.36 | 0.33 | 12.2 | 0.37 | 3 |
| 31 | 750 | 12.0 | 0.60 | 0.20 | 12.3 | 0.62 | 17 |
| 32 | 750 | 12.0 | 0.18 | 0.67 | 12.2 | 0.18 | 0 |
| 33 | 750 | 12.0 | 0.36 | 0.33 | 12.2 | 0.37 | 3 |

TABLE 4

| Test No. | Steel type | Thickness t(mm) | Plating adhesion amount (g/m²) | Alloying Processing | Heating condition Heating temperature T1(° C.) | Heating and holding time t1 (min.) | Average cooling rate before forming (° C./sec.) |
|---|---|---|---|---|---|---|---|
| 34 | B | 1.4 | 98 | Not done | 900 | 1 | 30 |
| 35 | C | 0.8 | 95 | Not done | 900 | 1 | 30 |
| 36 | C | 0.8 | 128 | Not done | 900 | 1 | 30 |
| 37 | C | 0.8 | 127 | Not done | 900 | 1 | 30 |
| 38 | C | 0.8 | 124 | Not done | 900 | 1 | 30 |
| 39 | D | 1.4 | 114 | Not done | 900 | 1 | 30 |
| 40 | D | 1.4 | 103 | Not done | 900 | 1 | 30 |
| 41 | D | 1.4 | 127 | Not done | 900 | 1 | 30 |
| 42 | E | 1.4 | 111 | Not done | 900 | 1 | 30 |
| 43 | E | 1.4 | 118 | Not done | 900 | 1 | 30 |
| 44 | E | 1.4 | 93 | Not done | 900 | 1 | 30 |
| 45 | F | 1.4 | 100 | Not done | 900 | 1 | 30 |
| 46 | F | 1.4 | 114 | Not done | 900 | 1 | 30 |
| 47 | F | 1.4 | 105 | Not done | 900 | 1 | 30 |
| 48 | A | 1.4 | 117 | Not done | 900 | 10 sec. | 30 |
| 49 | A | 1.4 | 112 | Not done | 900 | 10 sec. | 30 |

TABLE 4-continued

| Test No. | Forming start temperature T2 (° C.) | Intended strain amount (%) | Intended strain rate (sec.$^{-1}$) | Forming time (sec.) | Actual strain amount (%) | Actual strain rate (sec.$^{-1}$) | Maximum cracking depth (μm) |
|---|---|---|---|---|---|---|---|
| 34 | 750 | 12.0 | <u>0.60</u> | 0.20 | 12.2 | <u>0.61</u> | <u>13</u> |
| 35 | 750 | 7.4 | 0.11 | 0.67 | 7.7 | 0.11 | 0 |
| 36 | 750 | 7.4 | 0.22 | 0.34 | 7.7 | 0.23 | 1 |
| 37 | 750 | 7.4 | 0.37 | 0.20 | 7.6 | 0.38 | 2 |
| 38 | 750 | 7.4 | <u>0.67</u> | 0.11 | 7.6 | <u>0.69</u> | <u>29</u> |
| 39 | 750 | 12.0 | 0.18 | 0.67 | 12.2 | 0.18 | 0 |
| 40 | 750 | 12.0 | 0.36 | 0.33 | 12.3 | 0.37 | 3 |
| 41 | 750 | 12.0 | <u>0.60</u> | 0.20 | 12.3 | <u>0.62</u> | <u>18</u> |
| 42 | 750 | 12.0 | 0.18 | 0.67 | 12.3 | 0.18 | 0 |
| 43 | 750 | 12.0 | 0.36 | 0.33 | 12.2 | 0.37 | 3 |
| 44 | 750 | 12.0 | <u>0.60</u> | 0.20 | 12.3 | <u>0.62</u> | <u>18</u> |
| 45 | 750 | 12.0 | 0.18 | 0.67 | 12.1 | 0.18 | 0 |
| 46 | 750 | 12.0 | 0.36 | 0.33 | 12.2 | 0.37 | 2 |
| 47 | 750 | 12.0 | <u>0.60</u> | 0.20 | 12.3 | <u>0.62</u> | <u>20</u> |
| 48 | 750 | 12.0 | 0.18 | 0.67 | 12.2 | 0.18 | 7 |
| 49 | 750 | 12.0 | 0.36 | 0.33 | 12.2 | 0.37 | 5 |

It is possible to achieve the following consideration from the above results. Test Nos. 1 to 3, 5 to 7, 10 to 12, 14 to 16, 19, 22, 24, 26, 28, 30, 32, 33, 35 to 37, 39, 40, 42, 43, 45, 46, 48 and 49 are examples that satisfy requirements defined in the present invention, and it can be found that the occurrence of LME cracking is suppressed and that satisfactory hot press-formed articles are obtained. The all forming times in these examples satisfy the condition of [t/(R+t/2)] seconds or more.

In contrast, since Test Nos. 4, 8, 9, 13, 17, 18, 20, 21, 23, 25, 27, 29, 31, 34, 38, 41, 44, 47 were obtained by performing the press-forming under conditions outside the requirements defined in the present invention, that is, under conditions of higher strain rates, the maximum cracking depths is large.

While the present invention has been explained in detail with reference to specific embodiments, it is apparent to one skilled in the art that various changes and modifications can be made therein without departing from the spirit and scope of the present invention.

This application is based on Japanese Patent Application (No. 2013-065233) filed on Mar. 26, 2013, the contents of which are incorporated here by reference.

INDUSTRIAL APPLICABILITY

The present invention is effective as a method of manufacturing a structural member of an automobile component such as a side member, a side sill, a cross member, or a pillar lower part by press-forming a galvanized steel sheet or a hot-dip galvannealed steel sheet.

REFERENCE SIGNS LIST

1 Punch
2 Die
3 Blank holder
4 Steel sheet (blank)

The invention claimed is:

1. A process for manufacturing a press-formed article by a hot press-forming method, the process comprising:
heating and holding a galvanized steel sheet or a hot-dip galvannealed steel sheet,
subsequently starting forming the steel sheet at a temperature of 680° C. or more and 750° C. or less in a state in which liquid zinc is present on a surface of the steel sheet; and
performing the forming while setting a strain rate at a plastic deformation portion of the steel sheet to be 0.5 seconds$^{-1}$ or less,
wherein the heating and holding of the steel sheet is performed at a temperature of 880° C. or more and 920° C. or less for a period of from 10 seconds to 4 minutes.

2. The process according to claim 1, wherein the forming of the plastic deformation portion is performed for [t/(R+t/2)] seconds or more, where t by mm represents a thickness of the steel sheet and R by mm represents a curvature radius of the plastic deformation portion.

3. The process according to claim 1, wherein the forming of the steel sheet occurs at a temperature of 700° C. or more and 720° C. or less.

4. The process according to claim 1, wherein said strain rate at a plastic deformation portion of the steel sheet is 0.4 seconds$^{-1}$ or less.

5. The process according to claim 1, wherein said strain rate at a plastic deformation portion of the steel sheet is 0.3 seconds$^{-1}$ or less.

6. The process according to claim 1, wherein the heating and holding of the steel sheet is performed at a temperature of 880° C. or more and 920° C. or less for a period of from 10 seconds to 3 minutes.

7. The process according to claim 1, wherein the heating and holding of the steel sheet is performed at a temperature of 880° C. or more and 920° C. or less for a period of from 30 seconds to 4 minutes.

8. The process according to claim 1, wherein the heating and holding of the steel sheet is performed at a temperature of 880° C. or more and 920° C. or less for a period of from 30 seconds to 3 minutes.

9. The process according to claim 1, wherein the heating and holding of the steel sheet is performed at a temperature of 880° C. or more and 920° C. or less for a period of from 60 seconds to 4 minutes.

10. The process according to claim 1, wherein the heating and holding of the steel sheet is performed at a temperature of 880° C. or more and 920° C. or less for a period of from 60 seconds to 3 minutes.

11. The process according to claim 9, wherein the forming of the plastic deformation portion is performed for [t/(R +t/2)] seconds or more, where t by mm represents a thickness of the steel sheet and R by mm represents a curvature radius of the plastic deformation portion.

12. The process according to claim 1, which further comprises cooling the steel sheet obtained from said subsequently starting forming, wherein a cooling rate of said cooling is 30° C./ second or more.

13. The process according to claim 1, the steel sheet obtained from said subsequently starting forming comprises at least one zinc-plated layer present on a surface of the steel sheet, wherein an amount of zinc in each zinc-plated layer is from 30 to 200 g/m$^2$ for each surface of said steel sheet.

* * * * *